United States Patent Office 3,644,418
Patented Feb. 22, 1972

---

3,644,418
2,2-BIS(p-CHLOROPHENYL)-3,3-DIMETHYLOXETANE
George Holan, Brighton, Victoria, Australia, assignor to Commonwealth Scientific and Industrial Research Organization, East Melbourne, Victoria, Australia
No Drawing. Filed Feb. 13, 1969, Ser. No. 799,111
Claims priority, application Australia, Feb. 20, 1968, 33,896/68
Int. Cl. C07d 3/00
U.S. Cl. 260—333         1 Claim

ABSTRACT OF THE DISCLOSURE

The invention provides a new compound 2,2-bis(p-chlorophenyl)-3,3-dimethyloxetane having insecticidal properties. It may be made by irradiating a mixture of 4,4'-dichlorobenzophenone and isobutylene with ultra-violet radiation or by reacting p-chlorobenzenemagnesium halide with β-bromopivaloyl chloride.

SUMMARY OF THE INVENTION

This invention relates to a new insecticidal compound and to processes for the synthesis of such compound.

The compound provided by this invention, 2,2-bis(p-chlorophenyl)-3,3-dimethyloxetane, has the general Formula I

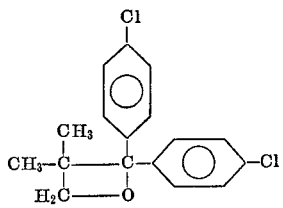

This compound has insecticidal properties.

The invention also includes methods for the synthesis of the new compound and in accordance with this aspect of the invention there is provided a process for preparing the compound of Formula I stated above which comprises irradiating with ultra-violet radiation a mixture of 4,4'-dichlorobenzophenone and isobutylene (2-methylpropene-1). Preferably the two reactants are dissolved in a suitable solvent, such as for example, benzene. Preferably also the ultra-violet radiation is of comparatively long wavelength such as that transmitted by Pyrex glass. In general the most suitable radiation is of a wavelength of between about 2000 and about 4000 A.

As isobutylene is a volatile compound it may conveniently be employed in the process of the invention by passing it in gaseous form into a solution of 4,4'-dichlorobenzophenone in benzene while the solution is being irradiated.

DETAILED DESCRIPTION OF THE INVENTION

Other methods of preparation of the compound I are also available.

For example the compound can be prepared by the reaction of p-chlorobenzenemagnesium halide with β-bromopivaloyl chloride (3-bromo - 2,2 - dimethylpropanoyl chloride).

The new compound described herein may be incorporated in a suitable inert solvent, or mixture of solvents, or in a solid mixture, with or without other substances, such as wetting, dispersing and sticking agents. The compound may be employed in such compositions either as the sole toxic agent or in combination with other insecticides such as pyrethrum, rotenone, or copper salts, or with fungicidal or bactericidal agents, to provide compositions useful for household and agricultural dusts and sprays, textile coating and impregnation, and the like. The compound may be dissolved in suitable organic solvents to provide solutions of enhanced utility. The new compound may also be placed in aqueous suspension by dispersing organic solvent solutions of the compound in water. The new compound may also be mixed with an inert, finely divided, solid diluent or carrier, such as bentonite, bole, talc, charcoal, pumice, calcium carbonate, and the like. The insecticidal compound may be admixed in its original form or in solution. The new compound is active against injurious insects of all kinds, such as moths, mosquitos, flies, beetles, and others.

The insecticidal activity of compound I may be enhanced by synergists or potentiators of the kind known per se. In particular, the potentiator "Sesoxane" i.e. 2-(3,4-methylenedioxy-phenoxy)-3,6,9-trioxaundecane, may be employed for this purpose. The amount of "Sesoxane" employed may vary from ⅟₂₅ to twice the weight of compound I.

The preparation and properties of the compound of Formula I are illustrated by the following specific examples. It should be noted, of course, that these examples are intended to be illustrative of the methods and procedures utilized in preparing the compound and that they are not intended to be restrictive or to be regarded as embodying the only way in which the compound can be formed and recovered.

EXAMPLE 1

A solution of 4,4'-dichlorobenzophenone (2.6 g.) and isobutylene (20 ml.) in benzene (60 ml.) was irradiated for 12 hours with light from an ultra-violet lamp ("Phillips" HPK 125W BA15B). The reaction vessel was purged with nitrogen during the irradiation period.

The solution was evaporated and the solid product obtained was crystallised from petroleum ether (B.P. 30–40° C.) to give 2,2-bis(p-chlorophenyl)-3,3-dimethyloxetane, M.P. 89° C. Yield 0.9 g.

*Analysis.*—Found (percent): C, 68.8; H, 5.2; Cl, 23.0. $C_{17}H_{16}Cl_2O$ requires (percent): C, 66.4; H, 5.2; Cl, 23.2.

The infra-red spectrum showed the characteristic 1000 cm.$^{-1}$ band of the oxetane ring.

The proton magnetic resonance spectrum had maxima at 1.07 p.p.m., singlet (6H), 4.15 p.p.m., singlet (2H), 7.33 p.p.m., multiplet (8H).

Mass: M$^+$=306,308 (the two peaks are due to $^{35}$Cl and $^{37}$Cl).

EXAMPLE 2

The product of Example 1 was prepared in 60% yield by the reaction of one mole of β-bromopivaloyl chloride with two moles of p-chlorobenzenemagnesium bromide in ether. The reaction was carried out using standard Grignard techniques.

EXAMPLE 3

The above described compound was tested for insecticidal activity using the common housefly. The test insects were 2 day old females of the WHO/IN/*Musca domestica*/1, DDT-susceptible strain and the compound was applied topically in acetone. Controls were used and the statistically significant LD$_{50}$ was found to be 0.95 microgrammes per insect by statistical analysis of the mortality data.

Using identical techniques the above described compound was tested against a DDT resistant strain (Turamurra) of *M. domestica*. For this insect the LD$_{50}$ for DDT is greater than 400 microgrammes per insect. LD$_{50}$ for compound I is 3.3 microgrammes per insect.

EXAMPLE 4

In further tests yellow fever mosquito larvae (*Aedes aegypti*, first instar larvae, WHO strain, DDT-susceptible) gave $LC_{100}$ (i.e. the last concentration tested at which 100% kill of larvae was observed, compared with 0% of controls, in 48 hours)=0.5 p.p.m.

EXAMPLE 5

The compound of the invention was also tested for activity against the Queensland cattle tick (*Boophilus microplus*—Yeerongpilly strain) larvae. The tests were carried out by enclosing the larvae in filter paper packets impregnated with a solution containing a known concentration of the compound. The packets were stored at 80° F. and a relative humidity in excess of 85% after which the numbers of killed and living larvae were counted. Analysis of the mortality figures obtained gave $LC_{50}$ as 1.08%.

EXAMPLE 6

The compound of the invention was tested for acute mammalian toxicity on female Swiss albino mice. The compound was injected intraperitoneally in ethylene glycol (50%) solution. Analysis of mortality data gave $LD_{50}$ as 3500 mg./kg. of body weight.

EXAMPLE 7

The following are examples of inecticidal compositions in accordance with the invention. All parts are by weight.

(a) Water dispersable powder

The following powdered composition is intended for dispersing in water for application as a spray.

| | |
|---|---|
| Compound of Formula I | 50.0 |
| Synthetic fine silica | 30.0 |
| Alkyl aryl sodium sulphonate | 1.5 |
| Methyl cellulose (15 cp.) | .25 |
| Attapulgite | 8.25 |

(b) Spray formulation

The following composition is adapted for spray application.

| | |
|---|---|
| Compound of Formula I | 4.0 |
| "Sesoxane" | 1.0 |
| Pyrethrum | 0.1 |
| Deodorized kerosene | 79.4 |
| Alkylated naphthalene | 16.0 |

(c) Aerosol

The following materials are metered into a suitable "bomb" container sealed and equipped with a valve in the usual way.

| | |
|---|---|
| Compound of Formula I | 3.0 |
| Methylene chloride | 10.0 |
| Freon 12 | 43.0 |
| Freon 11 | 43.0 |

It will be appreciated that modifications may be made to the process of my invention as specifically described above, and it is to be understood that the invention includes all such modifications which fall within its spirit and scope.

I claim:
1. 2,2-bis(p-chlorophenyl)-3,3-dimethyloxetane.

References Cited

UNITED STATES PATENTS 3,418,330  12/1968  Arnold et al. _____ 260—297

OTHER REFERENCES

Arnold et al., Tetrahedron Letters No. 22, pp. 1425–30, 1964.

Nerdel et al., Angew. Chem., 71 (10) 1959, p. 339.

NORMA S. MILESTONE, Primary Examiner

U.S. Cl. X.R.

204—158 R; 424—278